Patented Sept. 28, 1937

2,094,023

UNITED STATES PATENT OFFICE 2,094,023

MANUFACTURE OF YEAST

Alfred Pollak, Woodmere, N. Y.

No Drawing. Application April 12, 1935,
Serial No. 16,037

9 Claims. (Cl. 195—88)

This invention relates to new and useful improvements in the manufacture of yeast and more particularly the type of yeast grown in mashes prepared from waste products and in synthetic mashes.

The object of this invention is to produce yeast having a stronger fermenting power and better keeping quality than could be produced by means of the methods used heretofore.

Stability and resistance of the yeast depend upon the stability and resistance of the individual yeast cells. These qualities of the cells will be assured if and when the zymatic enzymes and the proteoclastic enzymes in the cell are well balanced. It is a known fact that saccharomyces, for instance, which enjoy the widest use in the fermentation industries are highly enzymatic if the amount of nitrogen-containing compounds and the percentage of phosphoric acid in the ash are high. Yet, yeast grown in media containing a plentiful supply of nitrogen and phosphoric acids has not proven satisfactory. Such yeast, when used for baking purposes, for instance, after producing an initial rise of the dough rapidly becomes inert. This is due to the fact that the conditions described not only give rise to an increase in zymatic enzymes but also to a correspondingly large increase in proteoclastic enzymes. Due to these proteoclastic enzymes the yeast autolyzes rapidly, destroying the zymatic action and damaging the structure of the still soft and sensitive gluten. The thermal death point of the yeast cells is also lowered, which is a decided disadvantage. Moreover, the free $P_2O_5$ radical, although highly important for the dismutation of the carbohydrates, has an adverse physiological effect upon the cell protoplasm.

The object of the present invention is to overcome these and other defects familiar to yeast producers, and I accomplish this object by feeding the yeast with a nutrient causing active propagation of the zymatic enzymes and sugar cleaving enzymes such as invertase and maltase, while restricting and counteracting the development of proteoclastic enzymes. It has been found that the development of the latter will be retarded if during propagation the yeast is given but a limited amount of nitrogen. Furthermore, the quality of the yeast will be improved if during its growth the protoplasm of the cells is strengthened. This may be done by favoring the formation of proteins and by producing an advanced stage of condensation of all the elements utilized in that process, viz.: the inorganic nitrogen, the amino acids, the peptones, etc.

As the result of a great number of experiments I have made with a large variety of substances, I have discovered that the presence of phytin is the deciding factor in the production of yeast, and the present invention is based upon the use of phytin or phytic acids as a yeast nutrient. Phytin is the CaMg-salt of the hexaphosphoric acid inositol. Under the influence of the enzyme phytase, the phytin will be split into inositol and phosphoric acid or the acid CaMg-salts.

Inositol, when added to a yeast culture greatly favors the propagation of the cells, the growth of cell protoplasm and the formation of enzymes. The presence of enzymes in the cell, moreover, is highly beneficial to the quality of the yeast because it is the presence of sugar splitting enzymes such as maltase and invertase which precedes the final formation of the alcohol producing zymase. Yeast thus produced and containing a large amount of maltase will be all the more efficient for baking purposes because the sugar finally offered to the yeast in the dough is maltose. The presence of sugar, on the other hand, is absolutely indispensable for fermentation. Similarly, the formation of invertase may be stimulated and it will depend upon the kind of the yeast and the medium in which it is grown which one of the sugar splitting enzymes will be prevalent.

Inositol when added to yeast gives rise to increased formation of the zymase complex; but the activity of the latter depends upon a sufficient quantity of $P_2O_5$ ions which in turn are kept in check by Ca ions or Mg ions or a combination of both. But, all three substances, viz.: inositol, $P_2O_5$ compounds and CaMg compounds are contained in the phytin. The presence of the mineral ingredients is of great importance and it is often advisable to feed the yeast with additional amounts of mineral substances besides those contained in the phytin.

Phytin which is abundant in nature constitutes a cheap nutrient for yeast. Some raw materials of great practical value containing phytin are e. g. malt sprouts, various brans and cotton seed cakes. From these the phytin may be extracted by means of hot or cold water or diluted acid, with or without pressure. For the purpose of the present invention, phytin may be used either pure or as an ingredient contained in other substances otherwise suitable as a yeast nutrient. Phytin is contained in industrial waste products such as various kinds of steepwaters and press waters, the spent wash from mashes left over after distilling grains, potatoes, beets, roots, sugar syrups, molasses, berries, etc. If desired, the wash may be decolorized in known manner.

Phytin as a stimulant and nutrient may be added to the yeast at various stages. Several ways of offering the phytin to the yeast are described in the following examples:

Example I

One way of improving the quality of yeast is by adding phytin or phytin containing substances, during fermentation, directly to the mash in which the yeast is grown. This process is particularly well suited for mashes containing a great amount of fermentable sugar, but which are devoid of organic stimulants and other nutrients. Such substances are for example mashes made from molasses, sulphite waste liquor, wood sugar, secondary glucose syrups, cane syrups etc. The amount of stimulant to be added depends upon the original constitution of the material in the mash, upon the amount of yeast to be produced per unit of sugar in the mash and upon the enzymatic qualities of the yeast to be produced. The quantity of the stimulant will range between 2% and 20% of the quantity of the mash material. The exact amount must be determined for each individual case. This is best done by first preparing an experimental mash. The amount of the inorganic N and $P_2O_5$ which are ordinarily used as nutrients for the yeast will be reduced in proportion to the amount of soluble organic N and $P_2O_5$ contained in the organic stimulant.

It is possible to add the entire amount of the stimulant (i. e. phytin or its constituents) at the beginning of fermentation; however, from a practical standpoint, it is preferable to add the stimulant distributed over the entire length of time of fermentation and in proportion to the amount of yeast present in the fermenting mash. In mashes which are started with a large quantity of seed-yeast, e. g., 15%–25%, and which are strongly aerated during fermentation, it is advisable to add varying quantities of the stimulating nutrient intermittently during periods of minimum budding of the yeast. During those periods the stimulant fulfills the important mission of activating the formation of P-containing nucleoproteins. The latter are essential constituents of the cell nuclei and favor further propagation of the cell because the increased P-metabolism produces rapid growth of the nuclei with the result that the latter split up quickly and form new cells. By adding the stimulant intermittently, as above described, the mash will be well balanced from a physiological point of view, the rhythm of growth will remain even throughout the fermenting process and the yeast produced will be uniform with respect to the size of the cells and their enzymatic strength.

As a general rule the organic stimulant contains sufficient minerals to produce a sufficiently high ash content in the yeast. If the stimulant is poor in mineral constituents, the Ca and Mg content may be increased by directly adding to the mash during fermentation neutral salts of Ca or Mg or both, as for instance chlorides, sulfates (or these salts coupled as acid phosphates) or salts of organic acids or the readily soluble lactophosphate. In order to avoid precipitation, care should be taken that the sum of the salts to be added and the salts present in the mash are properly proportioned with respect to the pH value of the mash. However, if temporary precipitation should occur the same will do no harm nor will any accumulation be of consequence.

Example II

Phytin and phytin containing substances may also be used to advantage for improving seed-yeast. For this purpose a usual mash is prepared and the stimulant added in the same proportions as in Example I. For cases in which the entire seed mash is used for stocking a single big mash, as in the case of alcohol mashes and certain low yield yeast mashes, the stimulant to be used for the big mash may be applied directly to the seed yeast mash.

In cases where no separate seed yeast mash is prepared, but where compressed yeast is used as stocking yeast, it is advisable to pre-treat the stocking yeast in a solution of the stimulant. The pre-treatment is performed in the presence of a sufficient amount of carbohydrates and the solution is sufficiently aerated in order to enable the yeast cells to split and assimilate the phytin and its constituents. All of the yeast mixture thus prepared is subsequently added to the big mash wherein the balance of the stimulant is also utilized. The pre-treatment may be performed at a temperature of about 30° C., the concentration of the solubles being about 10 to 15° Bllg., the proportion of the solubles to the yeast (computed on the basis of dry substances) equalling about 1 to 2 or 3 and the time required for the treatment being 1 to 2 hours.

It should be noted that this treatment may be employed both for "top fermenting yeast" and "bottom fermenting yeast". In the latter instance, it will sometimes be necessary to separate the yeast from the solubles left in the solution and to rewash the yeast in water.

Example III

If it be desired to improve yeast already prepared and finished, so as to give it greater baking strength and stability, a method similar to the one described in Example II may be used. However, the following differences should be observed: Aeration should be stronger in this case in order to render the yeast capable of assimilating all the alcohol formed during the dismutation of the carbohydrates; the solution of the solubles present, however, should be weaker than in Example II, say 4°–8° Bllg. If it be desired to increase the N content of the yeast, inorganic N should be added in the same proportion. The treatment is performed at a temperature of about 30° C. and continued until all the assimilable N has been absorbed and all the alcohol contained in the mash has disappeared through assimilation. Simultaneously therewith, a sufficient amount of mineral substances is taken in by the yeast which will produce a higher ash content. The required amount of the stimulant will be about 3 to 5% of the amount of yeast used (which is based on a computation of dry substances). A like amount of sugar containing substances is added and both substances are diluted to a strength of 4° to 8° Bllg. and adjusted to a pH between 5 and 6. After the treatment, the yeast is separated from the solution and rewashed and pressed in the usual way. The cost of this treatment is practically nil as the weight of the yeast will be increased and its qualities greatly improved.

I claim:

1. The method of growing yeast in synthetic mashes, which comprises the following steps: preparing a mash, ascertaining the phytin content of the latter, placing yeast in said mash, adding to the mash such amount of phytins as to cause an increased production of zymatic enzymes over that of proteoclastic enzymes and continuing to add phytins to produce an excess amount of zymatic enzymes over the proteoclastic enzymes, whereby a stronger yeast is obtained.

2. The method of improving finished yeast which has been fermented, ripened and separated from the spent liquor of a synthetic mash, which comprises the following steps: ascertaining the proportion between the zymatic enzymes and the proteoclastic enzymes in the finished yeast, preparing a mash, ascertaining the phytin content thereof, disposing the finished yeast in the mash, adding phytin to the mash in amounts sufficient to produce an excess of zymatic enzymes over the proteoclastic enzymes and fermenting the mash, whereby the quality of the yeast will be improved.

3. The method of growing seed yeast, which comprises the following steps: preparing a mash, ascertaining its phytin content, placing seed yeast in the mash and adding phytin in amounts sufficient to produce an excess of zymatic enzymes over the proteoclastic enzymes, whereby the seed yeast is improved.

4. The method claimed in claim 1, in which pure phytin is added to the mash.

5. The method claimed in claim 1, in which constituents of phytin are added to the mash.

6. The method claimed in claim 1, in which phytin is added to the mash in conjunction with calcium and magnesium containing compounds.

7. The method claimed in claim 3, which comprises adding a larger amount of phytin to the mash than is required for the desired proportion of zymatic enzymes to proteoclastic enzymes, and preparing a big new mash and stocking the latter with the said first mash which is over-rich in phytin, whereby the excess amount of phytin in the first mash is used in the second mash.

8. The method claimed in claim 1, in which said phytin is added intermittently to the mash.

9. The method claimed in claim 1, in which said phytin is added to the mash during periods of minimum budding of the yeast and which comprises the step of adding thereafter calcium and magnesium compounds to the mash during the ripening period of the yeast.

ALFRED POLLAK.